(12) United States Patent
Graves et al.

(10) Patent No.: US 10,081,291 B2
(45) Date of Patent: Sep. 25, 2018

(54) ANCHOR PLATE FOR PICK-UP TRUCK BOX

(71) Applicant: Ford Global Technologies, LLC, Dearborn, MI (US)

(72) Inventors: Gregory Graves, Milford, MI (US); Richard Bolt, Ypsilanti, MI (US); Timothy George, Tecumseh (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/918,733

(22) Filed: Oct. 21, 2015

(65) Prior Publication Data

US 2017/0113596 A1 Apr. 27, 2017

(51) Int. Cl.
*B60P 7/08* (2006.01)
(52) U.S. Cl.
CPC .................................. *B60P 7/0807* (2013.01)
(58) Field of Classification Search
CPC .................................................... B60P 7/0807
USPC ... 410/101, 102, 104–116, 8, 144, 145, 150; 24/265 CD, 115 K; 248/499
See application file for complete search history.

(56) References Cited

U.S. PATENT DOCUMENTS

| | | | | |
|---|---|---|---|---|
| 2,660,130 A | * | 11/1953 | Johnson | B61D 45/001 410/112 |
| 3,722,911 A | | 3/1973 | Rhody | |
| 4,191,108 A | * | 3/1980 | Jones | B60P 7/10 410/110 |
| 5,516,245 A | * | 5/1996 | Cassidy | B60P 7/15 410/101 |
| 5,700,118 A | * | 12/1997 | Bennett | B60P 7/15 410/113 |
| 5,807,047 A | * | 9/1998 | Cox | B60P 7/15 410/143 |
| 5,934,849 A | * | 8/1999 | Haire | B60P 7/0815 410/101 |
| 6,109,846 A | * | 8/2000 | Davis | B60P 7/0823 410/100 |
| 6,113,328 A | | 9/2000 | Claucherty | |
| 6,256,844 B1 | | 7/2001 | Wheatley | |
| 6,799,927 B2 | * | 10/2004 | Wheatley | B60P 7/0815 410/104 |
| 6,966,734 B2 | * | 11/2005 | Toteff | B60P 3/077 410/104 |
| 7,811,036 B2 | | 10/2010 | Armour | |
| 7,815,405 B2 | | 10/2010 | Aftanas | |
| 2009/0299921 A1 | * | 12/2009 | Krawczyk | B60P 3/055 705/500 |

* cited by examiner

*Primary Examiner* — Stephen T Gordon
(74) *Attorney, Agent, or Firm* — Jason Rogers; Brooks Kushman P.C.

(57) ABSTRACT

An anchor plate attached to a base wall of a recess in a sidewall or inner surface of a tail gate. The anchor plate includes a connection wall that defines an E-clip opening or receptacle. A tie-down bar is attached to or formed as a part of the connection wall.

7 Claims, 2 Drawing Sheets

ANCHOR PLATE FOR PICK-UP TRUCK BOX

TECHNICAL FIELD

This disclosure relates to anchor plates that are adapted to be attached to a pick-up truck box that facilitate securing objects on the truck box.

BACKGROUND

Pick-up trucks are widely used in business and for recreation for transporting a wide variety of types of cargo. Truck owners may customize their pick-up truck box to provide convenient locations for tie down straps or E-clip connectors that are used to secure tools, motorcycles, recreation vehicles, containers, or other cargo. Pick-up truck owners drill holes in the pick-up truck box or use existing holes or other structural features such as edge flanges or the top end of the bed wall to provide connection points for accessories. Drilling holes in a pick-up truck boxes creates potential problems because it increases the extent of corrosion, disrupts the integrity of the bed walls and may reduce the strength of the structure. Securing objects to a pick-up truck box using existing structural features may not meet all of a user's needs and requirements.

Aluminum is used to fabricate the sidewalls and floor of a pick-up truck to achieve substantial weight savings. Users may drill holes in the sidewalls or bed of prior art steel bed pick-up trucks to establish customized tethering locations. Drilling holes and assembling hooks or eyelets for securing heavy objects to anchors or fasteners to aluminum sidewalls and an aluminum bed of a truck box may not be effective due to the lower strength of aluminum.

The accessory interface system disclosed in U.S. Pat. No. 8,882,419 to Aguirre et. al. and assigned to the same applicant as this application proposed a detachable interface apparatus that was adapted to be secured in a recess formed in the sidewall of a pick-up truck box. While this approach offered an effective solution to the above problems, the cost of the interface apparatus was a disadvantage for some consumers and for fleet purchasers. The removability of the interface apparatus was also viewed as a disadvantage for fleet purchasers because of the potential for theft or loss of the interface apparatus.

This disclosure is directed to addressing the above problems and other problems as summarized below.

SUMMARY

According to one aspect of this disclosure, a truck box is disclosed that comprises a wall having an exterior surface lining the truck box that defines a recess. The recess in the exterior surface creates a protrusion on an inner surface. An anchor plate is attached to a base wall in the recess. The anchor plate includes a connection wall and a mounting flange secured to the base wall. The connection wall is spaced from the base wall and defines a clip receiving opening.

According to another aspect of this disclosure, an anchoring system is disclosed for securing objects to a pick-up truck box. The anchoring system comprises an exterior surface of the truck box that defines a recessed pocket including a base wall. An anchor plate has a connection wall defining a receptacle for a tie down apparatus and an attachment flange attached to the base wall.

According to other aspects of this disclosure that may relate to the truck box or anchoring system, the clip receiving opening may include a pair of elongated E-track slots that are separated by a tie-down bar. The E-track slots may be elongated in a vertical direction and the tie-down bar may extend in the vertical direction and may be located intermediate the pair of E-track slots. The tie-down bar may be a metal rod attached to the connection wall of the anchor plate. Alternatively, the tie-down bar may be an integrally formed portion of the anchor plate that extends across the clip receiving opening.

The truck box may further comprise a reinforcing brace attached to the wall and contacting the protrusion on the inner surface of the wall.

According to another aspect of this disclosure, the clip receiving opening may include a tie down bar extending across the clip receiving opening that includes a first lip and a second lip that are adapted to receive an E-track clip that is installed in an orientation that is perpendicular to the tie down bar.

The wall may be a sidewall, a floor or a front wall of the truck box.

The above aspects and other aspects of this disclosure are described in greater detail below with reference to the attached drawings.

DETAILED DESCRIPTION

A detailed description is provided below of the illustrated embodiments of the present disclosure. The disclosed embodiments are examples of the invention that may be embodied in various and alternative forms. The figures are not necessarily to scale. Some features may be exaggerated or minimized to show details of particular components. The specific structural and functional details disclosed are not to be interpreted as limiting, but merely as a representative basis for teaching one skilled in the art how to apply the disclosed concepts.

Figure 1:
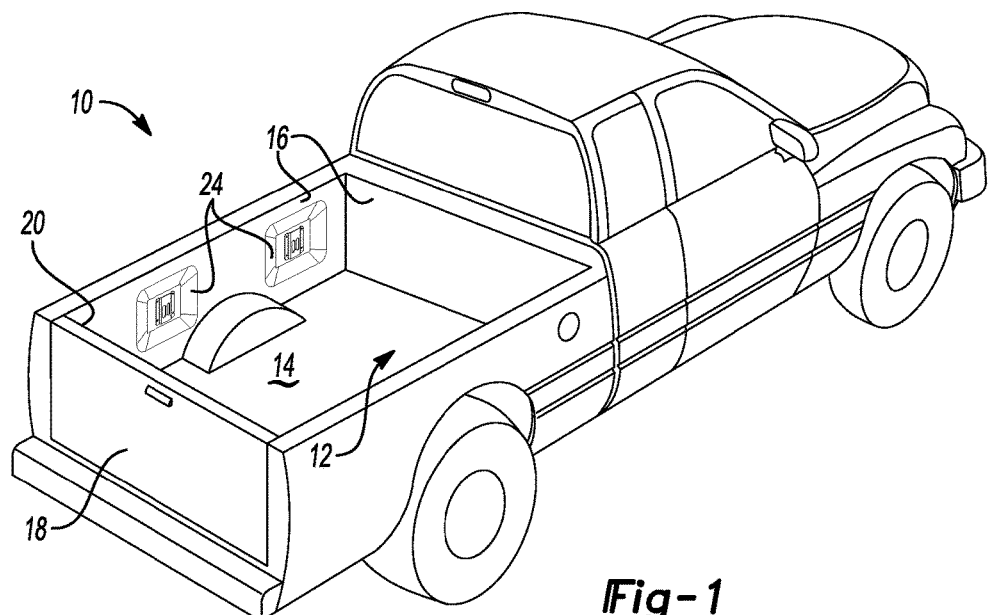
FIG. 1 is a rear/side perspective view of a pick-up truck that is provided with an anchor plate assembly made according to this disclosure.

Referring to FIG. 1, a pick-up truck 10 is shown to include a truck box 12. The truck box 12 includes a truck bed floor 14 and right, left, and front sidewalls 16. The pick-up truck 10 includes a tailgate 18 that has an inner wall 20. Recesses 24 are shown on one of the sidewalls 16. However, it should be understood that the recesses 24, or recessed pockets, may be provided on the inner wall 20 of the tailgate 18 or on any of the sidewalls 16 including the front sidewall 16.

Figure 2:
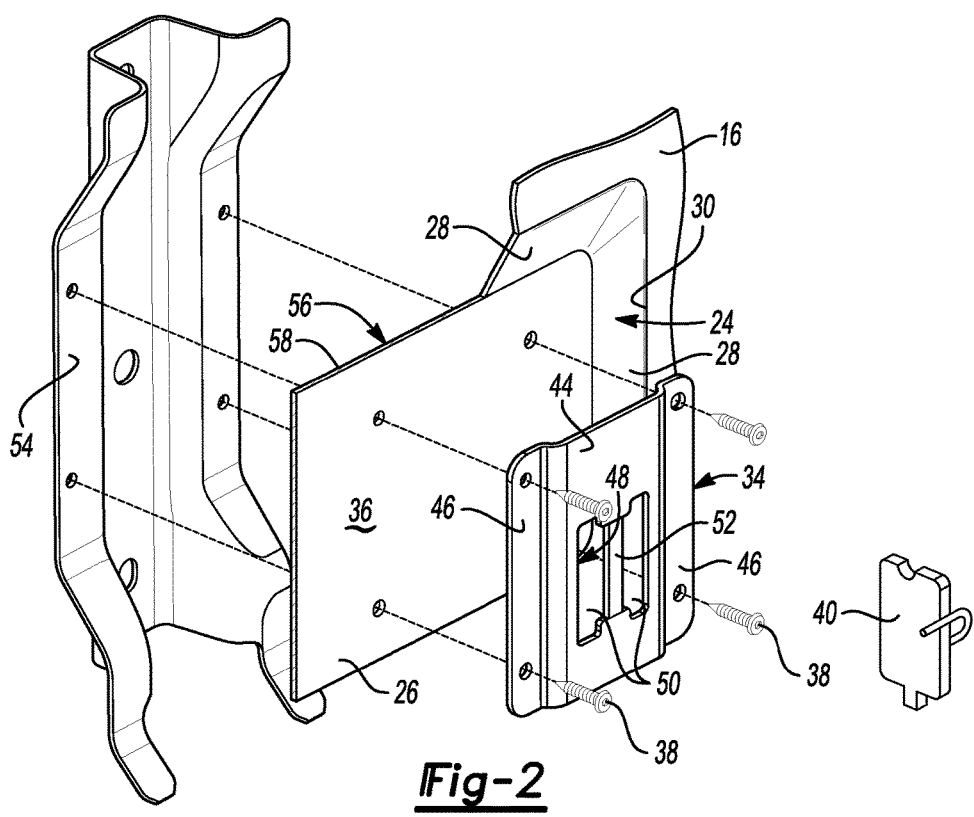
FIG. 2 is an exploded perspective view of a portion of the truck box wall, a dual clip receiving embodiment of the anchor plate, and a reinforcement.

Referring to FIG. 2, one of the recesses 24 is partially illustrated and is shown to include a base wall 26 and a plurality of recess walls 28 that extend inwardly from an edge of the open side of the recess 24 to the base wall 26. The recess walls 28 extend at an angle between the edge 30 and the base wall 26. An anchor plate, generally indicated by reference numeral 34, is adapted to be secured to an exterior surface 36 of the base wall 26. A plurality of fasteners 38 are used to secure the anchor plate 34 to the base wall 26.

An E-clip 40 is shown in FIG. 2 in a position to be attached to a connection wall 44 of the anchor plate 34. The E-clip 40 is a standardized clip device that is used to connect loops, straps, nets or a wide variety of other articles to an E-clip receptacle.

Figure 3:
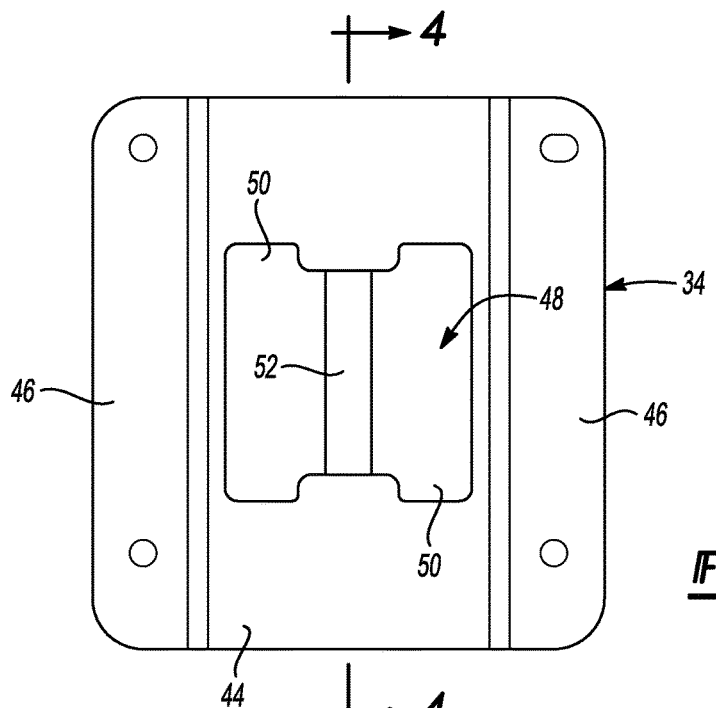
FIG. 3 is a side elevation view of the anchor plate shown in FIG. 2.
Figure 4:
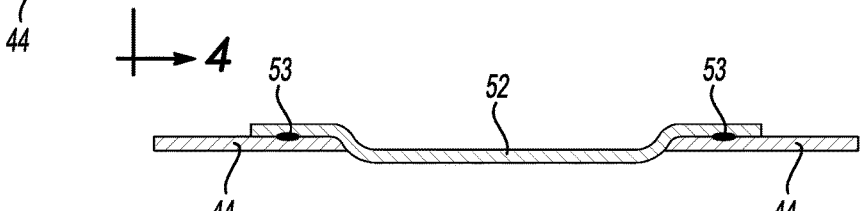
FIG. 4 is a cross-section view of the anchor plate taken along the line 4-4 in FIG. 3.

Referring to FIGS. 2-4, the anchor plate 34 includes mounting flanges 46 on opposite sides of the connection wall 44 that are adapted to be mounted to the base wall 26. The connection wall 44 is spaced from the base wall 26 to provide clearance for an E-clip 40 or for connecting a rope or hook to a tie-down bar 52. Holes are defined in the mounting flanges 46 that receive the fasteners 38. A clip receiving opening 48, or receptacle, is defined by the connection wall 44. A pair of elongated E-track slots 50 are provided in the clip receiving opening 48 of the embodiment of the anchor plate 34 illustrated in FIGS. 2-4.

As shown in FIGS. 3 and 4, a tie-down bar 52 is secured across the clip receiving opening 48 between the elongated E-track slots 50. The tie-down bar 52 shown in FIGS. 2-4 may be a flat bar or a cylindrical bar that is provided as a separate piece that is attached to the anchor plate 34. The tie-down bar 52 is connected to the back of the anchor plate 34 with welds 53 securing the tie-down bar 52 to the anchor plate 34. However, it should be understood that other joining techniques, including attaching fasteners, such as rivets or bolts, may be employed to secure the tie-down bar 52 to the anchor plate 34.

A reinforcing brace 54 is shown exploded away from the interior, or inside, of the base wall 26 of the recess 24. The reinforcing brace 54 is formed to conform to a protrusion 56, or bulge, that is created when the recess 24 is formed in the wall 16. The protrusion 56 is provided on an inner surface 58 of the sidewalls 16 and inner wall 20. The fasteners 38 used to connect the anchor plate 34 to the exterior surface 36 of the base wall 26 may also be used to secure the reinforcing brace 54 to the inner surface 58 of the base wall 26.

Figure 5:
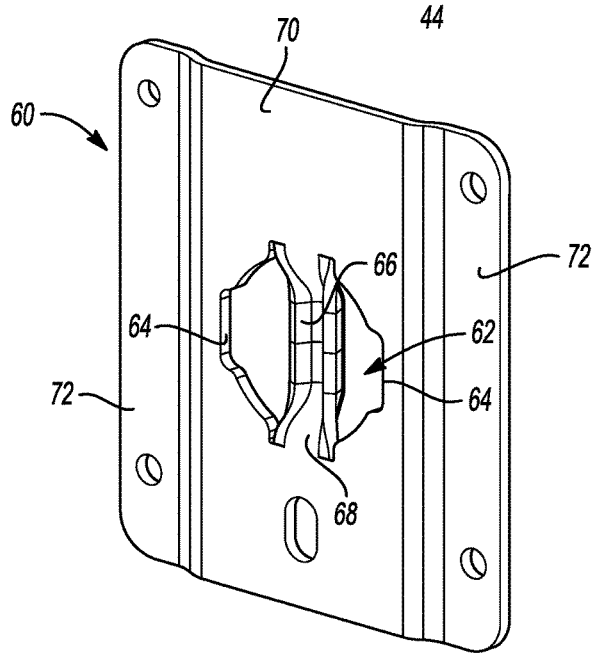
FIG. 5 is a perspective view of a single clip receiving embodiment of an anchor plate.

Referring to FIG. 5, an alternative embodiment of an anchor plate 60 is illustrated that is adapted to be secured within the recess 24, shown in FIGS. 1 and 2. The anchor plate 60 includes a single E-track opening 62, or E-clip receptacle. As shown, the E-track opening 62 is adapted to receive an E-clip in a horizontal orientation, but the plate 60 may be rotated 90° when attached to the recess 24 to receive an E-clip in a vertical orientation. The anchor plate includes lips 64 on opposite lateral sides of a tie-down bar 66. The two lips 64 are adapted to receive one of the E-clips 40. The tie-down bar 66 is an integrally formed portion of the anchor plate 60. Hooks, bungee cords, or the like may be attached or tied to the tie-down bar 66.

The anchor plate 60 includes a connection wall 70 that is flanked by mounting flanges 72. The connection wall 70 is spaced from the base wall 26 (shown in FIG. 2) to allow clearance for insertion of the E-clip 40 (shown in FIG. 2). The spacing of the connection wall 70 from the base wall 26 also provides clearance for attaching or tying to the tie-down bar 66.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A truck box comprising:
    a wall of the truck box having an exterior surface defining a recessed base;
    an anchor plate having a connection wall spaced from the base and a pair of longitudinal mounting flanges secured to the base, the connection wall defining a pair of openings elongated in a vertical direction relative to a truck box floor and horizontally separated by a tie-down bar spaced from the base;
    a protrusion on an inner surface of the wall opposite the recessed base in the exterior surface; and
    a reinforcing brace attached to the wall contacting the protrusion to reinforce the inner surface of the wall.

2. The truck box of claim 1, wherein the openings include a pair of elongated E-track slots that are separated by the tie-down bar.

3. The truck box of claim 2, wherein the tie-down bar extends in the vertical direction and is intermediate the pair of E-track slots.

4. The truck box of claim 2, wherein the tie-down bar is a metal rod attached to the connection wall of the anchor plate.

5. The truck box of claim 1, wherein the wall is a sidewall of the truck box.

6. The truck box of claim 1, wherein the wall is an inner surface of a tail gate of a truck.

7. A pick-up truck comprising:
    a truck box behind a passenger compartment and having a wall with an exterior surface defining a recessed base;
    an anchor plate having a connection wall spaced from the base and a pair of longitudinal mounting flanges secured to the base, the connection wall defining a pair of openings elongated in a vertical direction relative to a truck box floor and horizontally separated by a tie-down bar spaced from the base;
    a protrusion on an inner surface of the wall opposite the recessed base in the exterior surface; and
    a reinforcing brace attached to the wall contacting the protrusion to reinforce the inner surface of the wall.

* * * * *